United States Patent [19]
Kim

[11] Patent Number: 6,137,751
[45] Date of Patent: Oct. 24, 2000

[54] METHOD FOR CONTROLLING MOVING TIME OF SLED DEPENDING ON DEVIATION BETWEEN DECKS DURING INITIALIZATION OF OPTICAL DISK REPRODUCING APPARATUS

[75] Inventor: Se-tae Kim, Suwon, Rep. of Korea

[73] Assignee: SamSung Electronics Co., Ltd., Suwon, Rep. of Korea

[21] Appl. No.: 09/116,596

[22] Filed: Jul. 16, 1998

[30] Foreign Application Priority Data

Jul. 16, 1997 [KR] Rep. of Korea ...................... 97-33251

[51] Int. Cl.$^7$ .................................................. G11B 17/22
[52] U.S. Cl. ............................................................. 369/32
[58] Field of Search .................................. 369/32, 44.28, 369/44.27, 44.29, 33, 44.34, 44.35; 360/78.09, 78.05, 78.07, 78.13

[56] References Cited

U.S. PATENT DOCUMENTS

| | | |
|---|---|---|
| 5,136,569 | 8/1992 | Fennema et al. . |
| 5,175,716 | 12/1992 | Min .......................................... 369/32 |
| 5,228,019 | 7/1993 | Yanagi ...................................... 369/32 |
| 5,249,168 | 9/1993 | Kagami et al. . |
| 5,331,423 | 7/1994 | Ota et al. . |
| 5,406,537 | 4/1995 | Lee ........................................... 369/32 |
| 5,453,974 | 9/1995 | Minoda et al. . |
| 5,764,602 | 6/1998 | You et al. ................................. 369/32 |
| 5,841,739 | 11/1998 | Iida et al. ................................. 369/32 |
| 6,061,308 | 5/2000 | Nakamizo ................................. 369/32 |

FOREIGN PATENT DOCUMENTS

| | | |
|---|---|---|
| 63-275081 | 11/1988 | Japan ...................................... 369/32 |
| 1-162280 | 6/1989 | Japan . |

*Primary Examiner*—Tan Dinh
*Attorney, Agent, or Firm*—Robert E. Bushnell, Esq.

[57] ABSTRACT

A method for controlling moving time of a sled in consideration of deviation between decks when initializing an optical disk reproducing apparatus. The method includes the steps of: (a) measuring the time required by the sled for traveling a predetermined number of tracks of an optical disk, calculating a one (1) track moving time from the measured time, and comparing the calculated one (1) track moving time with a reference one (1) track moving time; and (b) lowering the voltage applied to a sled motor if the calculated one (1) track moving time is faster than the reference one (1) track moving time, and otherwise increasing the level of the voltage. As a result, the problem of variation in the sled's moving time according to deviation between decks is resolved, and deviation in access time between different decks is reduced, thereby improving the stability and reliability of the system.

20 Claims, 2 Drawing Sheets

METHOD FOR CONTROLLING MOVING TIME OF SLED DEPENDING ON DEVIATION BETWEEN DECKS DURING INITIALIZATION OF OPTICAL DISK REPRODUCING APPARATUS

CLAIM FOR PRIORITY

This application makes reference to, incorporates the same herein, and claims all benefits accruing under 35 U.S.C. §119 from an application for METHOD FOR CONTROLLING MOVING TIME OF SLED DEPENDING ON DEVIATION BETWEEN DECKS DURING INITIALIZATION OF OPTICAL DISK REPRODUCING APPARATUS earlier filed in the Korean Industrial Property Office on Jul. 16, 1997, and there duly assigned Ser. No. 33251/1997, a copy of which application is annexed hereto.

BACKGROUND OF THE INVENTION 1. Technical Field

The present invention relates to a method for initializing an optical disk reproducing apparatus, and more particulary to a method for controlling the moving time of a sled according to deviation by a deck when initializing an optical disk reproducing apparatus. 2. Related Art In general, an optical disk reproducing apparatus, particulary, a compact disk read-only-memory (CD-ROM) drive, which serves as an important peripheral unit of a computer system to provide a large amount of data storage capacity, is required to initialize for positioning an optical pick-up unit at a known track on an optical disk before processing information at high speed. During initialization of a CD-ROM, internal parameters such as digital signal processing (DSP) coefficient, focus bias and tracking balance as well as interface device control between a personal computer (PC) and the CD-ROM are adjusted for providing a high level of data storage system performance and reliability. Exemplars of initialization procedures of an optical disk such as CD-ROM are disclosed in U.S. Pat. No. 5,136,569 for *Optical Disk Recorder For Diverse Media Types And Having A Predetermined Initialization Or Start-Up Procedure* issued to Fennema et al., U.S. Pat. No. 5,249,168 for *Method And Apparatus For Initializing Optical Disk Drive Apparatus* issued to Kagami et al., and U.S. Pat. No. 5,453,974 for *Optical Disk Substrate, Method For Initialization Thereof And Driving Apparatus For Initialization Of Said Optical Disk* issued to Minoda et al.

However, system performance and reliability have been compromised when different types of deck are being used in the optical disk reproducing apparatus. For example, an initialization problem of an optical disk cannot be resolved when a sled is moved in relation to the deviation by different types of deck. That is, a reference value is applied to a deck, and a deck which is out of range of the reference value is determined as being inferior. In addition, a standard access time of different decks is different, which lowers the stability and reliability of the system.

SUMMARY OF THE INVENTION

Accordingly, it is therefore an object of the present invention to provide an optical disk reproducing apparatus and a method for initializing movement of an optical disk pickup head.

It is also an object to provide a method for controlling moving time of a sled in consideration of deviation between decks when initializing an optical disk reproducing apparatus.

It is further an object to provide a method for maintaining a moving time of a sled constant regardless of the deviation between decks of an optical disk reproducing apparatus.

These and other objects of the present invention can be achieved by a method for controlling moving time of a sled in consideration of deviation between decks when initializing an optical disk reproducing apparatus. The method comprises the steps of: (a) measuring the time required by the sled for traveling a predetermined number of tracks of an optical disk, calculating a one (1) track moving time from the measured time, and comparing the calculated one (1) track moving time with a reference one (1) track moving time; and (b) lowering the voltage applied to a sled motor and otherwise increasing the level of the voltage applied to the sled motor depending on the comparison.

Preferably, the predetermined number of tracks which the sled travels is equal to or greater than ¼ of the total number of tracks of an optical disk. The one (1) track moving time of the sled is calculated by dividing the measured time required for moving the sled across a predetermined number of tracks by the number of mirror signals output during movement of the sled. Preferably, the one (1) track moving time of the sled is calculated by dividing the measured time required for moving the sled across a predetermined number of tracks by the number of tracks which the sled travels.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
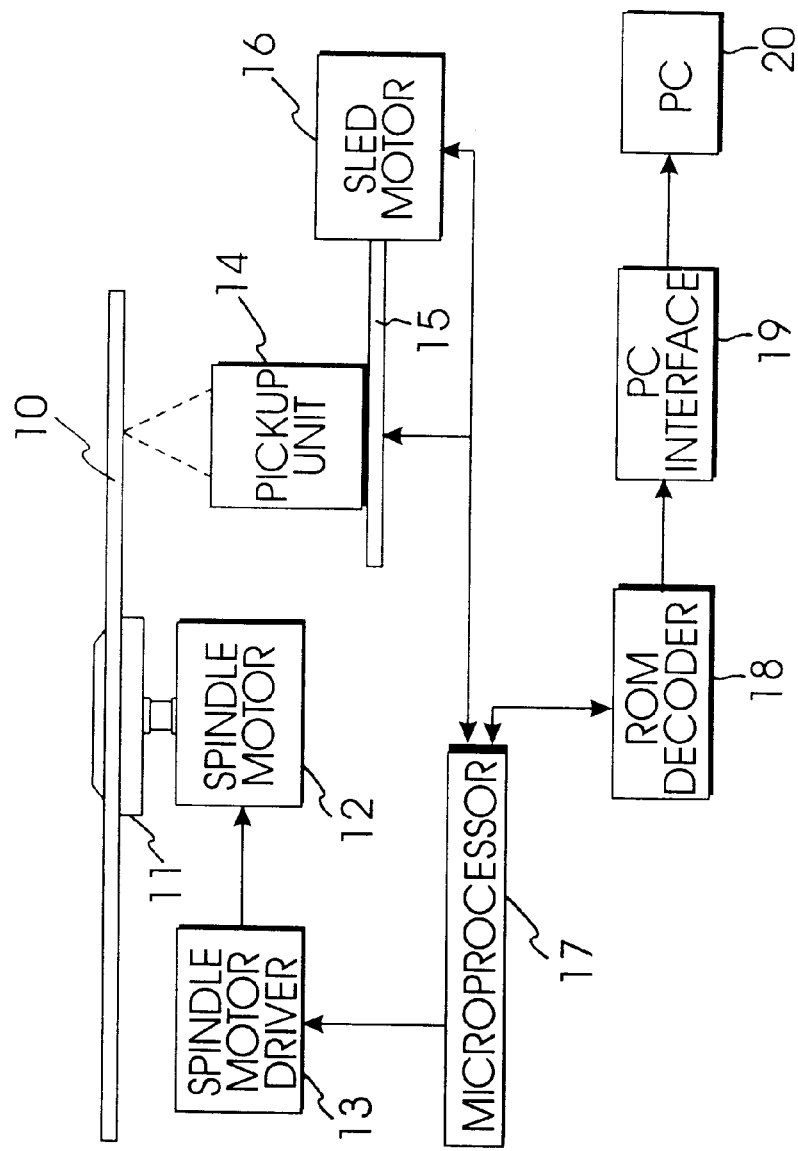
FIG. 1 is a block diagram of an optical disk reproducing apparatus.

Referring now to the drawings and particularly to FIG. 1, which illustrates an optical disk reproducing apparatus such as a CD-ROM drive for controlling moving time of a sled depending on deviation between decks during initialization according to the principles of the present invention. As shown in FIG. 1, the optical disk reproducing apparatus includes an optical disk 10 seated on a turntable 11, a spindle motor 12 for rotating the optical disk 10, a spindle motor driver 13 for driving the spindle motor 12, an optical pick-up unit 14 for reproducing information recorded on disk 10. The pickup unit 14 is mounted on a pickup driving shaft 15 connected to a sled motor 16 for linearing moving the pick-up unit 14 back and forth along a surface of disk 10. A microprocessor 17 is electrically connected to the spindle motor driver 13, the pick-up unit 14, and the sled motor 16 for controlling the overall operation of the entire system including the initialization of the disk 10. A ROM decoder 18 is connected to the microprocessor 17 for decoding and transmitting disk information input from microprocessor 17 to a host computer (PC) 20 via a PC interface 19.

Figure 2:
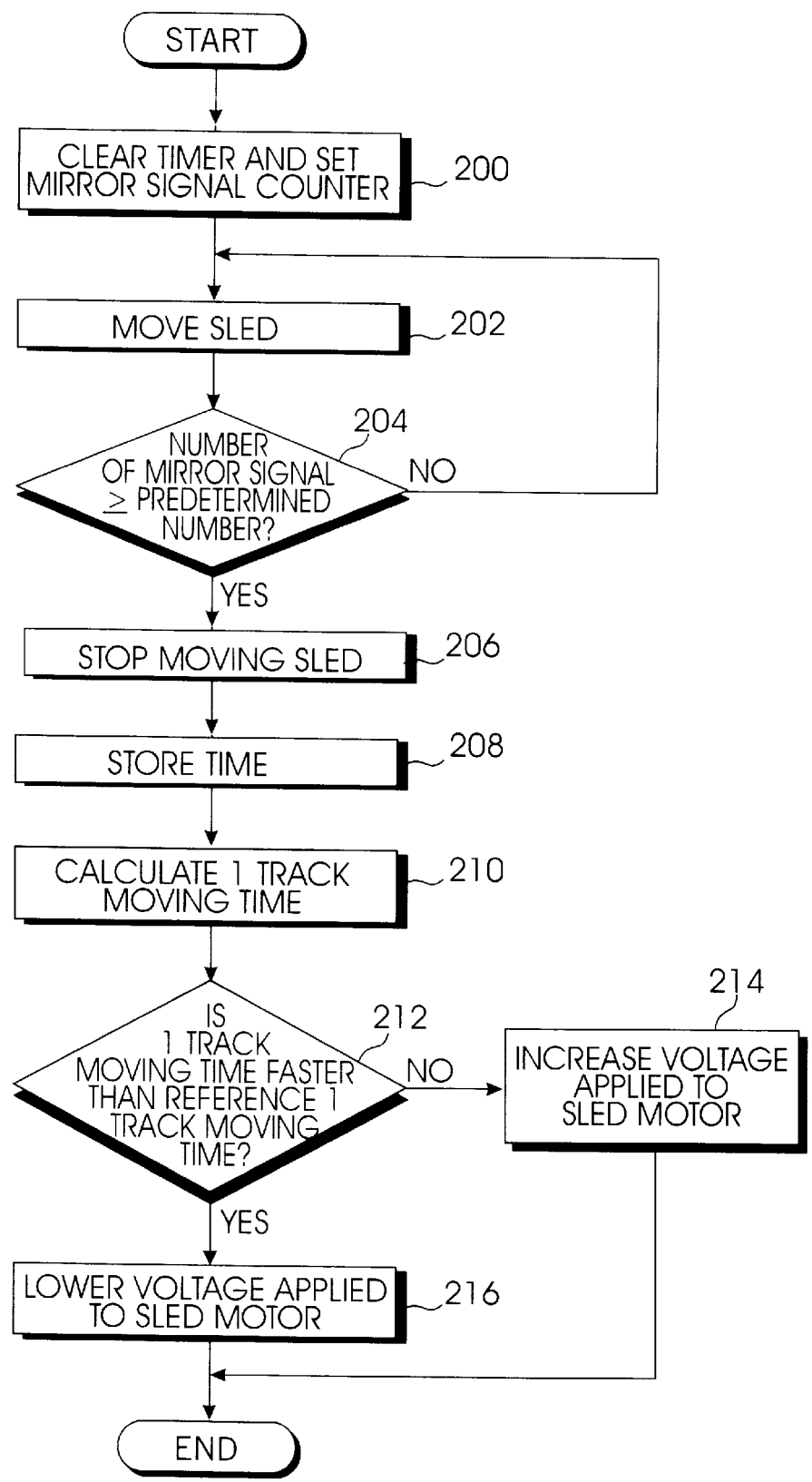
FIG. 2 is a flowchart illustrating a method for controlling moving time of a sled depending on deviation between decks when initializing an optical disk reproducing apparatus, according to the principles of the present invention.

Turning now to FIG. 2 which illustrates a process of controlling moving time of a sled depending on deviation between decks when initializing an optical disk reproducing apparatus as shown in FIG. 1 according to the principles of the present invention. As shown in FIG. 2, in order to control moving time of a sled (not shown) in consideration of deviation between decks when initializing an optical disk reproducing apparatus, an internal timer for calculating the moving time of the sled is cleared and an internal counter for counting the number of mirror signals is set by microprocessor 17 at step 200.

The microprocessor 17 then controls the sled motor 16 to move the sled at step 202, and determines whether the number of output mirror signals is equal to or greater than a predetermined number at step 204. If the number of output mirror signals is not equal to or greater than a predetermined number, the sled motor 16 continues to move the sled until the number of output mirror signals reaches the predetermined number.

When the number of output mirror signals reaches the predetermined number at step 204, the sled motor 16 stops moving the sled at step 206. Then, the moving time of the sled at this time point is stored in an internal memory at step 208. Here, the mirror signal indicates a signal output between tracks of an optical disk when the sled travels across the tracks. As another embodiment, track error signals may be counted. In the present invention, in order to exactly calculate a one (1) track moving time, the sled is moved across tracks corresponding to ¼ or more of the total tracks of an optical disk. That is, the total number of tracks of an optical disk is approximately 20 thousand, in general. However, the sled is moved about 5000 tracks which corresponds to ¼ of the total number of tracks of an optical disk, and the moving time of the sled at this time point is stored in the internal memory.

Then, a one (1) track moving time of the sled is calculated by dividing the time stored at step 208 by the number of output mirror signals at step 210. The one (1) track moving time of the sled, calculated at step 210, is compared with a reference one (1) track moving time of the sled at step 212. If the one (1) track moving time of the sled is faster than the reference one (1) track moving time of the sled, the voltage applied to a sled motor 16 as shown in FIG. 1 is lowered at step 216, thereby reducing the driving force for the sled. However, if the one (1) track moving time of the sled is slower than the reference one (1) track moving time of the sled, the voltage applied to a sled motor is increased at step 214, thereby increasing the driving force for the sled.

As described above, the method for controlling moving time of the sled, in consideration of deviation between decks when initializing an optical disk reproducing apparatus, solves the problem of variation in the sled's moving time according to deviation between decks when initializing an optical disk reproducing apparatus. As a result, the moving time of a sled remains constant regardless of the different types of deck used in the optical disk reproducing apparatus. In addition, deviation in access time according to deviation between decks is also reduced, thereby improving the stability and reliability of the system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A method for controlling moving time of a sled in consideration of deviation between decks of an optical disk reproducing apparatus when initializing said optical disk reproducing apparatus, said method comprising the steps of:

(a) measuring the time required by the sled to travel a predetermined number of tracks of an optical disk, calculating a one (1) track moving time from the measured time, and comparing the calculated one (1) track moving time with a reference one (1) track moving time; and (b) controlling the voltage applied to a sled motor according to the result of the comparison.

2. The method of claim 1, wherein in the step (b) of controlling the voltage, the voltage applied to the sled motor is lowered, when the calculated one (1) track moving time is faster than the reference one (1) track moving time.

3. The method of claim 2, wherein in the step (b) of controlling the voltage, the voltage applied to the sled motor is increased, when the calculated one (1) track moving time is slower than the reference one (1) track moving time.

4. The method of claim 1, wherein said predetermined number of tracks of said optical disk which the sled travels is equal to or greater than ¼ of the total number of tracks of said optical disk.

5. The method of claim 1, wherein said one (1) track moving time of the sled is calculated by dividing the measured time required for moving the sled across said predetermined number of tracks of said optical disk by the number of mirror signals output during the movement of the sled.

6. The method of claim 1, wherein said one (1) track moving time of the sled is calculated by dividing the measured time required for moving the sled across said predetermined number of tracks of said optical disk by the number of tracks which the sled travels across said optical disk.

7. The method of claim 1, wherein said optical disk corresponds to a compact disk read only-memory.

8. A method for controlling a sled of an optical disk reproducing apparatus during initialization, comprising the steps of:

clearing a timer for calculating a moving time of the sled, and setting a counter for counting a number of mirror signals;

moving the sled until the number of mirror signals reaches a predetermined number;

determining the moving time of the sled when the number of mirror signals reaches said predetermined number, and storing the moving time of the sled in a memory;

calculating a one track moving time from the moving time stored in said memory;

making a comparison of the calculated one track moving time and a reference one track moving time; and controlling a voltage applied to a sled motor moving the sled according to the result of said comparison.

9. The method of claim 8, wherein said voltage applied to the sled motor is lowered, when the calculated one track moving time is faster than the reference one track moving time.

10. The method of claim 9, wherein said voltage applied to the sled motor is increased, when the calculated one track moving time is slower than the reference one track moving time.

11. The method of claim 8, wherein said predetermined number of tracks of said optical disk which the sled travels is equal to or greater than ¼ of the total number of tracks of said optical disk.

12. The method of claim 8, wherein said one track moving time of the sled is calculated by dividing the moving time stored in said memory required for moving the sled across said predetermined number of tracks of said optical disk by the number of mirror signals.

13. The method of claim 8, wherein said one track moving time of the sled is calculated by dividing the moving time stored in said memory required for moving the sled across said predetermined number of tracks of said optical disk by the number of tracks which the sled travels across said optical disk.

14. The method of claim 8, wherein said optical disk corresponds to a compact disk read only-memory.

15. An optical disk drive apparatus, comprising:
   an optical disk comprising a plurality of tracks storing information;
   a spindle motor for rotating the optical disk;
   a spindle motor driver for driving the spindle motor;
   a sled for reproducing information recorded on said optical disk;
   a sled motor for linearing moving the sled back and forth along a surface of optical disk;
   a microprocessor electrically connected to the spindle motor driver, the pick-up unit, and the sled motor for controlling the overall operation of the entire system including initialization of the optical disk and controlling movement of the sled by:
      clearing a timer for calculating a moving time of the sled, and setting a counter for counting a number of mirror signals;
      moving the sled until the number of mirror signals reaches a predetermined number;
      determining the moving time of the sled when the number of mirror signals reaches said predetermined number, and storing the moving time of the sled in a memory;
      calculating a one track moving time from the moving time stored in said memory;
      making a comparison of the calculated one track moving time and a reference one track moving time; and
      controlling a voltage applied to a sled motor moving the sled according to the result of said comparison.

16. The optical disk drive apparatus of claim 15, wherein said microprocessor decreases the voltage applied to the sled motor, when the calculated one track moving time is faster than the reference one track moving time.

17. The optical disk drive apparatus of claim 15, wherein said microprocessor increases the voltage applied to the sled motor, when the calculated one track moving time is slower than the reference one track moving time.

18. The optical disk drive apparatus of claim 15, wherein said predetermined number of tracks of said optical disk which the sled travels is equal to or greater than ¼ of the total number of tracks of said optical disk.

19. The optical disk drive apparatus of claim 15, wherein said one track moving time of the sled is calculated by dividing the moving time stored in said memory required for moving the sled across said predetermined number of tracks of said optical disk by the number ofmirror signals.

20. The optical disk drive apparatus of claim 15, wherein said one track moving time of the sled is calculated by dividing the moving time stored in said memory required for moving the sled across said predetermined number of tracks of said optical disk by the number of tracks which the sled travels across said optical disk.

* * * * *